Oct. 12, 1943. B. A. MOSLING 2,331,713
TRAILER TRUCK AND BOOM THEREFOR
Filed Feb. 17, 1942 3 Sheets-Sheet 1
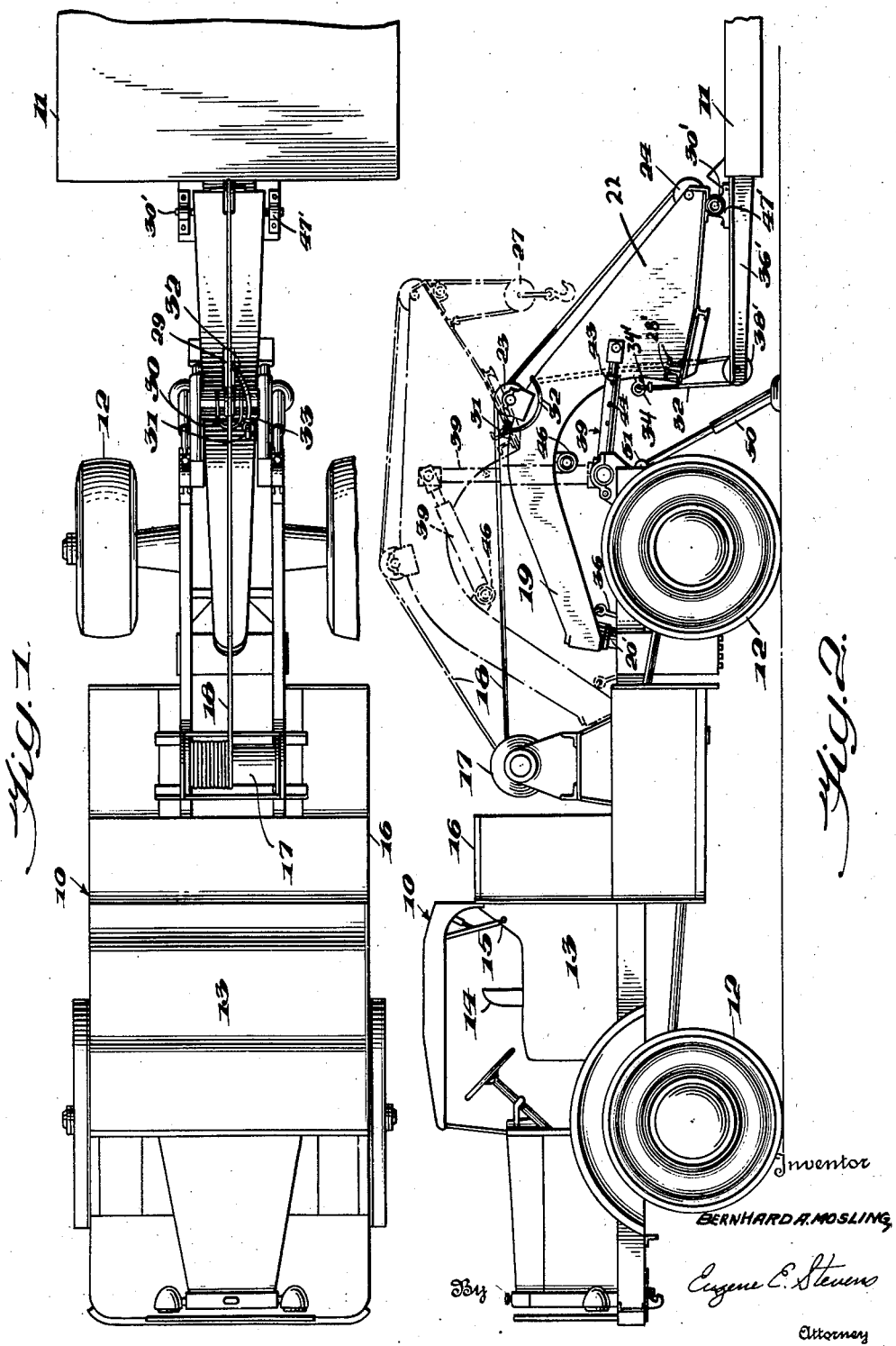

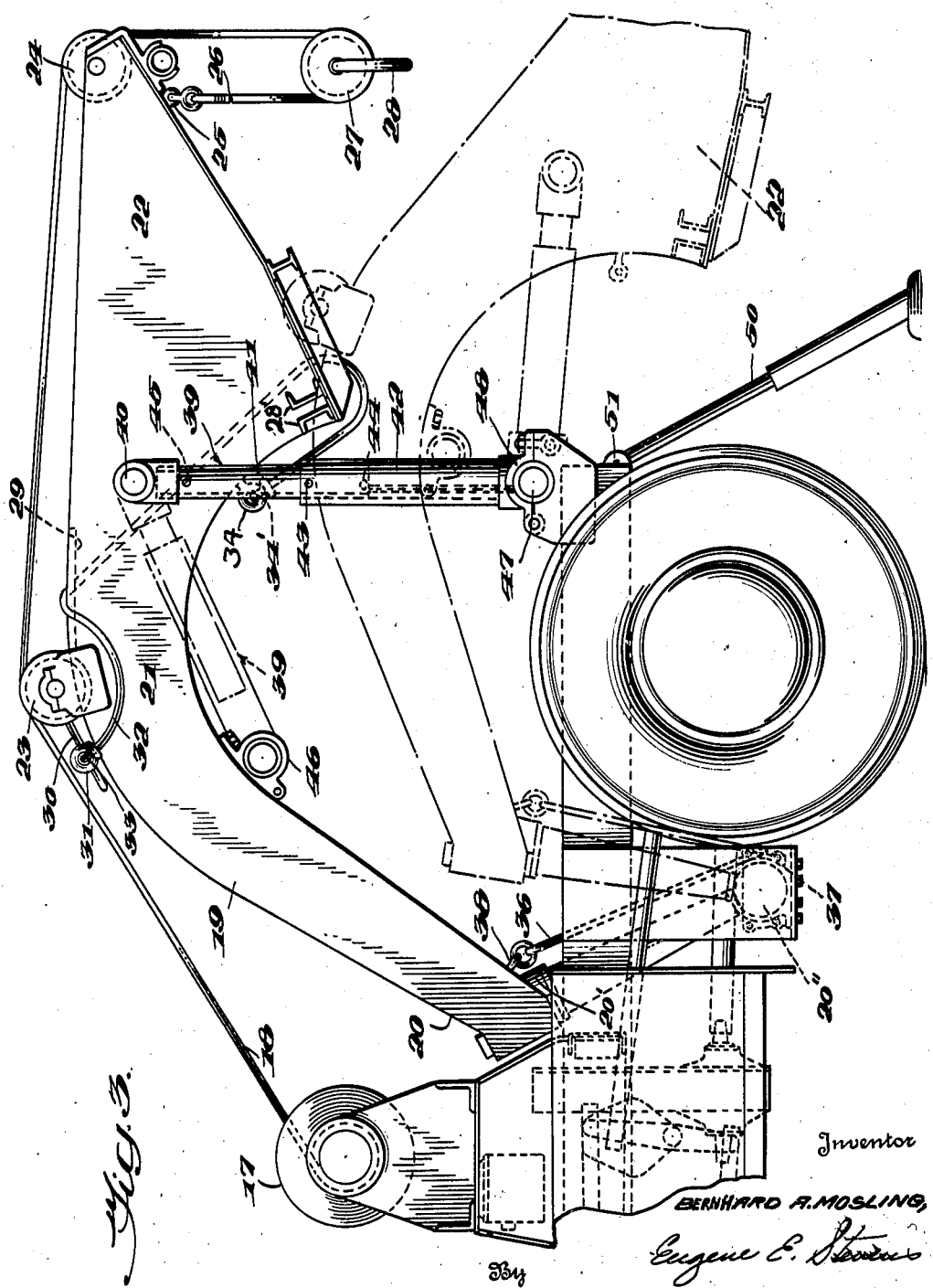

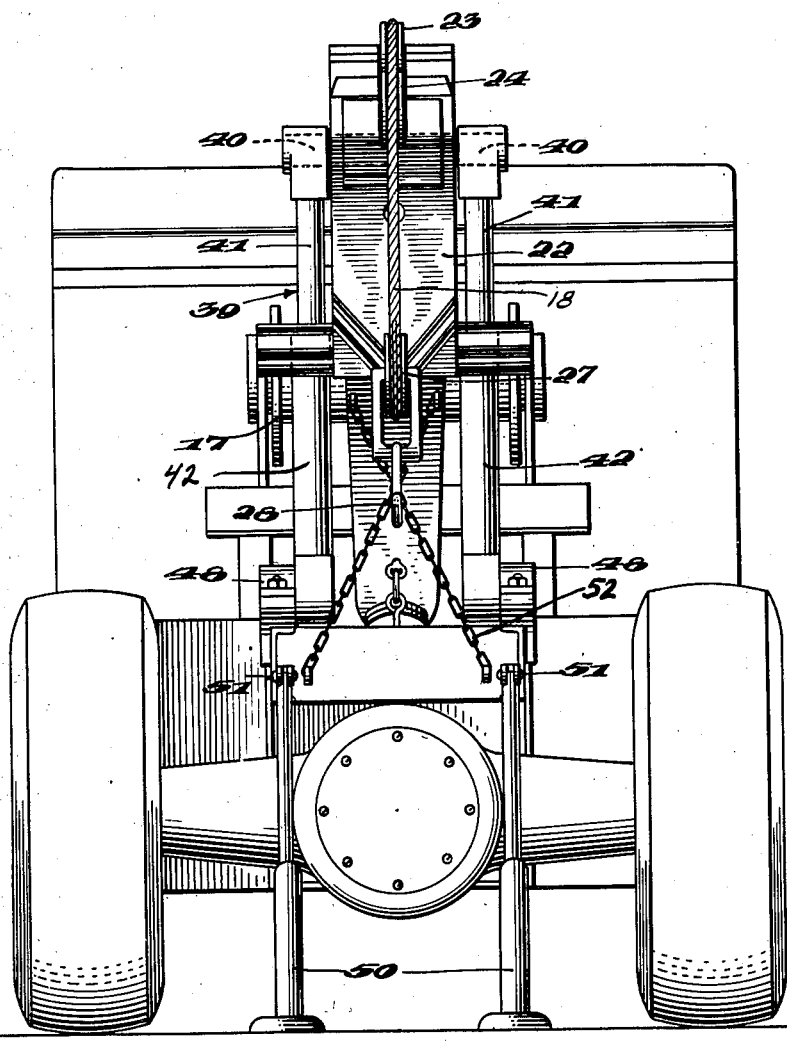

Patented Oct. 12, 1943

2,331,713

UNITED STATES PATENT OFFICE 2,331,713

TRAILER TRUCK AND BOOM THEREFOR

Bernhard A. Mosling, Oshkosh, Wis.

Application February 17, 1942, Serial No. 431,309

9 Claims. (Cl. 214—86)

My invention relates to trailer trucks, that is, trucks adapted to be connected to trailers for the hauling of the latter, and booms for such trailer trucks. Though not so restricted, my invention is particularly applicable for military use and to the transportation of heavy ordance, and the screw and ammunition therefor, or for the hauling of tanks, ordance, or like apparatus. In this connection, reference is had to my copending applications, Ser. No. 344,797, filed July 10, 1940; and Ser. No. 339,996, filed April 23, 1941, now Patent No. 2,312,769, granted March 2, 1943, which disclose, among other features, a boom or gooseneck carried by the tractor and which is rigidly connectable to a trailer.

With the foregoing in view, an object of my invention is to provide a novel combination of tractor or truck and a boom therefor.

A further object is to provide a novel trailer truck for ordnance which includes space for personnel and ammunition as well as means for coupling the truck to a trailer.

A further object is to provide in a boom for a trailer truck or tractor which is universally connected to the tractor for operation as a boom, means for locking said boom in an elevated position to transform the same into a rigid davit-like mast for hoisting heavy loads clear of the ground.

A further object is to provide with a device such as that last described of ground engaging means for bracing the tractor against overturning.

A still further object is to provide a novel boom or gooseneck for a tractor or for a trailer truck.

Other objects and advantages reside in the particular structure of my invention, combination and arrangement of the several parts, and in the particular mode of operation—as will be readily apparent to those skilled in the art upon reference to the drawings in connection with the specification, wherein the invention is shown described and claimed.

In the drawings:

Fig. 1 is a plan view of the invention showing the same coupled to a trailer, the trailer being only partially shown;

Fig. 2 is an elevation of Fig. 1;

Fig. 3 is a fragmentary enlargement of Fig. 2; and

Fig. 4 is a rear elevation of the invention, showing the boom locked in its raised position.

Referring specifically to the drawings, 10 designates generally a tractor which, as here disclosed, is a trailer truck having front and rear wheels 12, a cab 13 having front and rear seats 14 and 15 for personnel and a truck or compartment 16 for ammunition, tools, supplies, or the like. Rearwardly of the trunk 16 there is provided a drum 17 for a topping lift cable 18 of a boom or gooseneck 19. The boom 19 comprises a front end 20 (Fig. 3), universally connected at 20' through the medium of the ball and socket joint 20'', an intermediate hump 21 and a rear end 22 which is adapted to be secured to a trailer 11 in the manner disclosed in my co-pending application aforesaid, Ser. No. 389,996, filed April 23, 1941. Such connection, briefly, includes a bar 39' suitably carried by the rear end 22 of the boom which is engaged by the swingable clamp members 47' carried by the trailer beam 36'. The front portion of the beam is provided with the cable sheave 39' around which the cable runs to be secured to the pin 34. U-beams 28' serve to connect the front portion of the beam 36' to the boom through the medium of a U-shaped member (not shown), as clearly shown and described in the aforementioned case.

The hump 21 mounts a sheave 23 in suitable bearings and the tip of the rear end 22 of the boom mounts a second sheave 24 in suitable bearings. The cable 18 passes over the sheaves 23, 24, and a hook 26 on the free end of the cable may be hooked to an eye 25 on the underside of the rear end 22 of the boom. A block 27 which may include a hook 28 may be mounted on the bight of the cable intermediate the hook 26 and the rear sheave 24.

An opening 29 is formed through the upper surface of the hump 21 of the boom just rearwardly of sheave 23 and the shaft for the sheave 23 swingably mounts a bail 30. An eye 31 is provided on the upper surface of the hump 21 at any suitable point and is adapted to receive the hook 33 of a second cable 32 which extends through the hole 29 in the top of the hump and outwardly of the boom end 22 through an opening (not shown) in the bottom thereof. A hook 34' on this end of the cable may be secured to an eye 34 which may be located at any suitable under-surface point of the boom adjacent the boom end 22. The purpose of the details just described will appear later.

The front end 20 of the boom is universally connected to the truck or tractor in the same manner as in my co-pending applications aforesaid. However, in addition, I have provided suitable guy or brace means 36 having its upper end connected to the underside of the front end 20 of the boom as at 38 and its lower end connected to the tractor body as at 37 whereby to provide means for limiting the elevating movement of the boom. The member 36 is preferably a flexible cable of suitable strength but obviously may be a rigid bar having a sliding connection with one or both of the boom and tractor to permit lowering of the boom.

To brace the boom 19 against lateral swaying when the tractor is operating without the trailer, there is provided a suitable brace member generally indicated in Fig. 3 by 39. This member 39 is generally of inverted U-shape (Fig. 4) and comprises a cross bar 40 which extends transversely through the boom 19 and is journalled therein for swinging movement on a horizontal axis with the ends extending outwardly of the side of the boom. Parallel legs 41 depend from the ends of the bar 40 and are rigidly connected thereto in any suitable manner. The legs 41 are telescopically received in swingably mounted tubular leg extensions 42 whereby the legs may be extended from the solid line position of Fig. 2 to the broken line positions. The legs of the brace 39 may be locked in either the extended or closed positions by any suitable means such as the holes 44, 45 in the lower and upper ends of the legs 41 and the pins 43 of the leg extensions 42.

When the boom is connected to a trailer, obviously the brace 39 cannot be used as there must be a universal connection to permit sharp turns to be made. In this event the brace 39 is collapsed and swung to the broken line position of Fig. 3, where it is secured to the underside of the boom 19 by any suitable means such as the clamp 46. However, when it is used to brace the boom, the brace 39 is swung to the full line position of Fig. 3 either in the collapsed or extended form and the laterally and outwardly directed lower ends 47 of the leg extensions 42 are clamped to the tractor body by any suitable means such as the clamps 48. Thus, when the tractor is proceeding without a trailer the brace 39 will be in the solid line position of Fig. 3, but will be collapsed instead of being extended.

It frequently occurs, especially in military service, that it is desirable to transform the boom 39 into an elevated and rigid mast, whereby disabled vehicles or the like may be hoisted a considerable height from the ground. In this instance, the boom is elevated to its maximum height and the legs of the brace 39 are extended and secured. Then the cable 18 may be slacked and used as a hoisting cable or to pull a disabled vehicle out of the mud.

When the tractor is so used, the cable 18 is disconnected from the eye 25, and instead, is hooked in the bail 30 adjacent the sheave to facilitate the raising of the boom.

When the boom is to be coupled to a trailer for hauling the latter, the hook 26 on the free end of the cable 18 is hooked in the hook 33 of the second cable 32, the lower end of the cable 32 is connected to the trailer and the hitch accomplished in the same manner as that disclosed by my co-pending application aforesaid, Ser. No. 389,996, filed April 23, 1941. By providing a second cable 32, the operators need lose no time in threading the cable 18 through the boom 19.

To prevent the tractor 10 from being pulled over backwards when hoisting a heavy load with the brace 39 extended, suitable telescopic braces 50 are provided at the rear of the tractor. Such braces 50 are pivotally secured to the tractor as at 51 and when not in use may be collapsed, swung upwardly out of the way and be secured in any suitable manner (not shown).

Safety cross chains are shown at 52 in Fig. 4. These chains prevent the boom from traveling to either side when the boom is not attached to the supporting members 42 and are suitably connected to fasteners on the tractor body and the boom. These chains may be readily uncoupled when necessary and do not serve to limit the upward travel of the boom.

While I have shown and described what is now thought to be the preferred embodiment of my invention, it is to be understood that the same is susceptible to other forms and expressions without departing from the spirit of the invention and the scope of the subjoined claims.

I claim:

1. A combined hoisting and towing boom for a tractor, comprising an elongated beam-like member, means universally connecting one end of said boom to said tractor, tractor carried means for raising and lowering said boom, a brace member carried by said boom, said member being movable into and out of an operative position, means detachably connecting said brace member to said tractor when said member is in the operative position to rigidly support said boom, and said brace member being extensible whereby said boom may be rigidly supported at a plurality of selected heights.

2. A combined hoisting and towing boom for a tractor comprising an elongated beam-like member, means for universally connecting one end of said boom to said tractor, tractor carried means for raising and lowering said boom, tractor-carried means for bracing said boom against lateral swaying when in raised position, and means for collapsing said bracing means against the boom.

3. The structure of claim 2, said bracing means comprising a U-shaped member pivoted to the boom and tubular leg receiving extensions pivoted to the tractor body.

4. A combined hoisting and towing boom for a tractor comprising an elongated beam-like member, means for universally connecting one end of said boom to said tractor, tractor carried means for raising and lowering said boom, tractor-carried means for bracing said boom against lateral swaying when in raised position, said means being vertically adjustable and pivotally connected to said boom and to the tractor body.

5. The structure of claim 4, and means whereby said bracing means is collapsible against the boom.

6. The structure of claim 4, said bracing means comprising a U-shaped member telescopically received in leg extensions carried by the tractor body.

7. A combined hoisting and towing boom for a tractor comprising an elongated beam-like member, means for universally connecting one end of said boom to said tractor, a tractor-carried substantially U-shaped bracing member pivoted to said boom to prevent said boom from swaying laterally, means pivotally carried by the tractor body to receive the legs of said U-shaped member, and means for adjusting said bracing means vertically.

8. The structure of claim 2 and auxiliary bracing members carried by the tractor body for engaging the ground when said boom is in raised position.

9. A boom for a tractor comprising an elongated member, means for universally connecting one end of said boom to said tractor, a substantially U-shaped bracing member pivoted to said boom to prevent said boom from swaying laterally, means pivotally carried by the tractor body to receive the legs of said U-shaped member, means for adjusting said bracing means vertically, and means for uncoupling the brace member from the tractor body to permit the bracing means to be collapsed against the boom, and means carried by said boom to hold said bracing means in collapsed form.

BERNHARD A. MOSLING.